(12) United States Patent
Vaidyanathan

(10) Patent No.: US 6,909,800 B2
(45) Date of Patent: Jun. 21, 2005

(54) PROCESS AND APPARATUS FOR LOCATING COATED COOLING HOLES ON TURBINE VANES

(75) Inventor: Janakiraman Vaidyanathan, So. Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 776 days.

(21) Appl. No.: 09/738,966

(22) Filed: Dec. 15, 2000

(65) Prior Publication Data

US 2002/0076097 A1 Jun. 20, 2002

(51) Int. Cl.[7] .......................... G06K 9/00; G01N 21/00; G01N 25/00; G01N 25/72
(52) U.S. Cl. ..................... 382/152; 427/557; 356/51; 356/237.1; 250/330; 250/336.1; 374/5
(58) Field of Search .................. 382/141, 142, 382/143, 144, 145, 146, 147, 148, 149, 150, 151, 152, 154; 427/553, 557; 356/51, 237.1, 237.2; 250/330, 331, 332, 333, 334, 336.1, 338.1; 374/4, 5

(56) References Cited

U.S. PATENT DOCUMENTS

| | | | | |
|---|---|---|---|---|
| 4,726,104 A | * | 2/1988 | Foster et al. ................ | 29/889.1 |
| 4,861,618 A | * | 8/1989 | Vine et al. ................... | 427/454 |
| 5,054,087 A | * | 10/1991 | Carbon et al. ............... | 382/152 |
| 5,111,046 A | * | 5/1992 | Bantel ......................... | 250/330 |
| 5,125,035 A | * | 6/1992 | McCarthy et al. .......... | 382/141 |
| 5,773,790 A | * | 6/1998 | Moore et al. .......... | 219/121.71 |
| 6,004,620 A | * | 12/1999 | Camm ......................... | 427/142 |

* cited by examiner

*Primary Examiner*—Jingge Wu
*Assistant Examiner*—Ryan J. Hesseltine
(74) *Attorney, Agent, or Firm*—Bachman & LaPointe, P.C.

(57) ABSTRACT

The present invention relates to processes and systems for locating coated cooling holes on parts such as turbine vanes. In a first embodiment of the present invention, a thermal imaging technique is utilized to obtain the locations of the cooling holes on a turbine vane. In a second embodiment of the present invention, a laser scanning technique is utilized to obtain the locations of the cooling holes on a turbine vane.

13 Claims, 6 Drawing Sheets

PROCESS AND APPARATUS FOR LOCATING COATED COOLING HOLES ON TURBINE VANES

BACKGROUND OF THE INVENTION

The present invention relates to a process and system for quickly locating coated cooling holes in a part, such as a turbine vane, even though such holes are only partially visible. In a first embodiment of the present invention, the process and the system for locating the coated cooling holes uses thermal imaging techniques to determine the position of the cooling holes. In a second embodiment of the present invention, the process and the system for locating the coated cooling holes uses laser scanning techniques to determine the position and orientation of the cooling holes.

Currently, the repair process for turbine vanes involves cleaning the vanes and applying turbofix, a putty-like substance, over the entire vane area to cover the cooling holes and any cracked areas. The vanes are then brazed and the excess turbofix is removed by manual blending. The refurbished vanes are coated with a thermal barrier coating (TBC) and laser drilled to re-install the cooling holes.

In many cases, only a small section of the vanes need to be turbofixed and blended because the rest of the vane sections are good and do not need any additional operations other than the re-application of the thermal barrier coating. The re-application of the thermal barrier coating blocks the existing cooling holes. In these cases, if it were possible to locate the cooling holes, even though they are only partially visible, then the thermal barrier coating from the cooling holes can be removed by laser reaming. If used on turbine vanes, this process will save time and labor in the turbofixing, blending and laser drilling operations as only the necessary sections are turbofixed and blended. It is difficult to turbofix some vanes due to the geometry of the vanes and in these cases, locating the cooling holes to remove the thermal barrier coating becomes critical.

Since there is no current process available to locate the cooling holes precisely, all the vanes are fully turbofixed in many cases, even those not needing full treatment. If the holes could be located through the coating, then a lot of the turbofixing and blending can be eliminated with a drastic reduction in process time and turnaround time.

The problems in locating the TBC coated cooling holes are many. The first and the most challenging part is that the holes are partially covered by the thermal barrier coating, hidden to various extents, by the coating process. The second is that the cooling holes are very small, around 0.020 inches in diameter, and they need to be located precisely on a complex airfoil shape that is distorted to various extents during its operational life on the engine.

The present method for locating the position of a given cooling hole is manually locating each hole individually by viewing through a lens system and then laser reaming it. This method is time consuming and not accurate since the holes are only partially visible at best. The method involves a great deal of operator guesswork.

SUMMARY OF THE INVENTION

Accordingly, it is an object of the present invention to provide improved processes and systems for locating the positions of coated cooling holes on turbine vanes.

It is another object of the present invention to provide processes and systems as above which is easy to use and reduces process and turnaround time.

It is a further object of the present invention to provide processes and systems as above which can be used to reverse engineer the cooling holes on a turbine vane.

The foregoing objects are attained by the processes and systems of the present invention.

In a first embodiment of the present invention, the process for locating coated cooling holes on parts such as turbine vanes broadly comprises the steps of providing a part having a region of coated cooling holes, heating the part, and identifying the locations of the coated cooling holes by generating a high contrast thermal image of the part and the region of coated cooling holes.

The system for performing the above thermal imaging process comprises a heater for heating the part with the cooling holes, preferably substantially uniformly, and an infra red camera for taking a thermal image of the heated part. The system further comprises a computer for receiving the thermal image information and processing same to arrive at the location of the cooling holes in the part.

In a second embodiment of the present invention, the process for locating coated cooling holes on a part broadly comprises the steps of providing a scanning system with a laser spot sensor, scanning a surface of the part in a region containing a plurality of cooling holes with the laser spot sensor, storing information about said scanned region in the form of point cloud data representing points on the surface; and processing the point cloud data to determine a center point and axial orientation for each cooling hole in the region.

The system for performing the above laser scanning process broadly comprises a scanning system including a laser for directing light onto a surface of a part being scanned, a spot sensor for receiving light reflected by the part surface, and a computer, having a storage device, for receiving information about the scanned region and for storing the information in the form of point cloud data. The computer is further programmed to process the stored point cloud data information to determine the location of the cooling holes on the surface of the scanned part.

Other details of the processes and systems of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
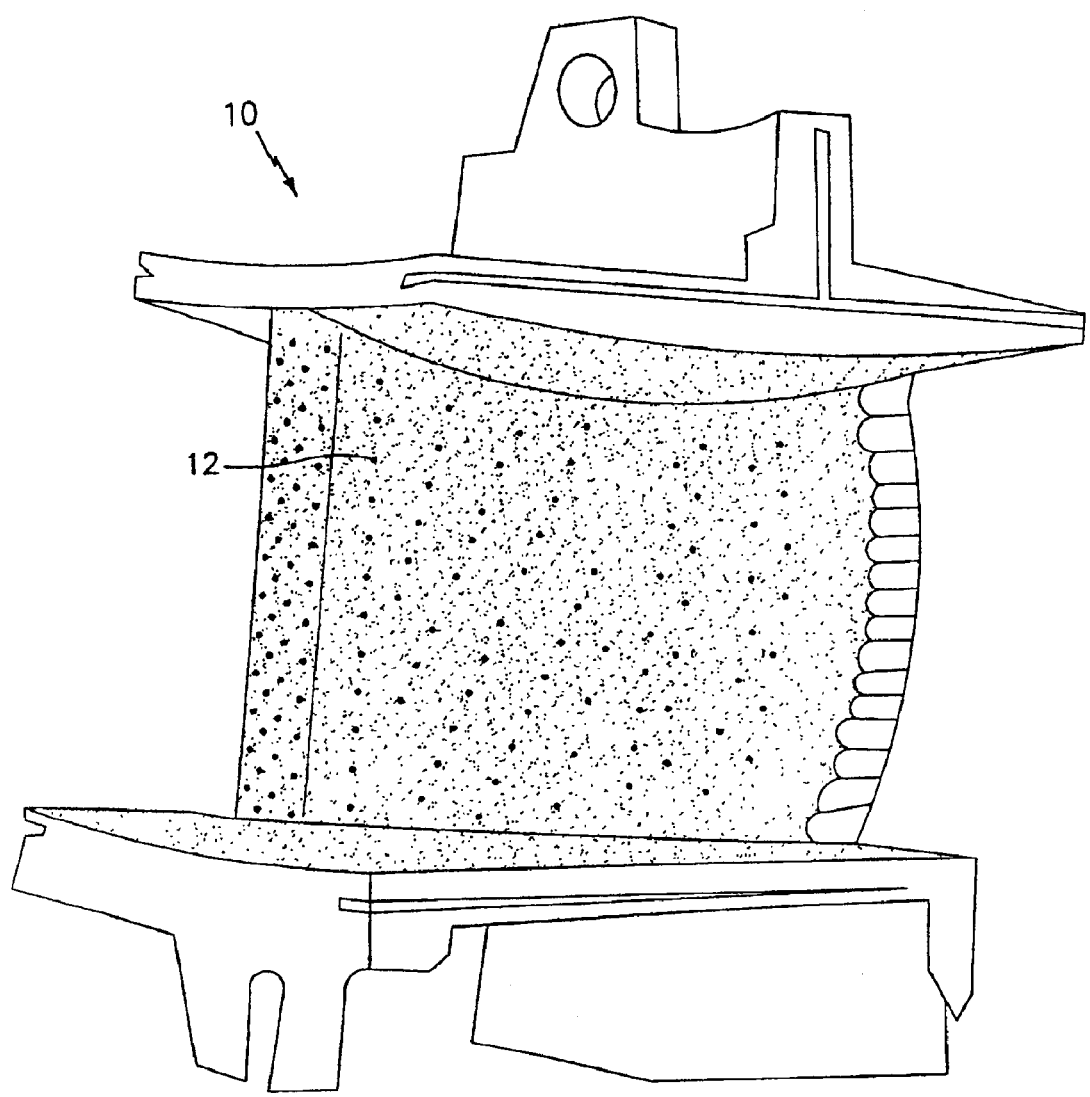
FIG. 1 is a perspective view of a turbine vane having a plurality of cooling holes.

Referring now to the drawings, FIG. 1 illustrates a turbine vane 10 having a plurality of cooling holes 12. As previously discussed, the cooling holes 12 are typically hidden from view by a thermal barrier coating (not shown) placed on the vane. The problem which the techniques of the present invention is intended to solve is the location of the cooling holes which are partially or wholly hidden by the thermal barrier coating.

Figure 2:
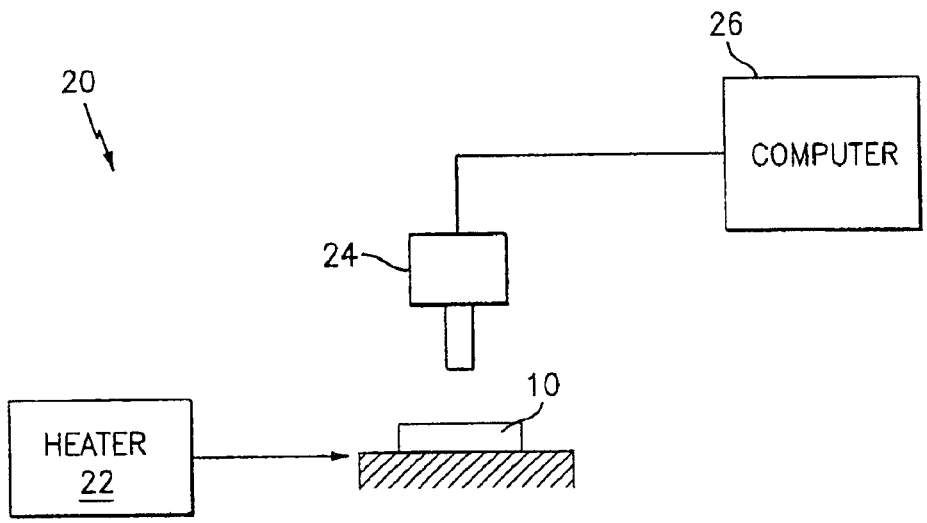
FIG. 2 is a schematic representation of a first embodiment of a system for locating the cooling holes in the vane.

Referring now to FIG. 2, in a first embodiment of the present invention, a thermal imaging system 20 is utilized to carry out a process for locating the coated cooling holes 12 on a part 10 such as a turbine vane. The system 20 includes a heater 22 for heating the part, preferably substantially uniformly, and an infra red camera 24 for capturing the infra red rays emitted by the part 10. The heater 22 may comprise any suitable heating means known in the art for heating the part 10 to be examined. For example, the heater 22 may comprise a radiant heater. Alternatively, the heater 22 may comprise a device for blowing hot air onto the part 10 to be examined.

The infra red camera 24 may comprise any suitable infra red camera known in the art. Such cameras typically have a frame with an area defined by a finite number of pixels. In a preferred aspect of the present invention, the relative positions of the camera 24 and the region(s) containing the cooling holes 12 on the part 10 are arranged so that when an image is taken by the camera 24, the image completely fills in the pixels in the frame area so as to achieve maximum resolution.

The system 20 further comprises a computer 26 connected to the camera 24 to receive the thermal images taken by the camera. The computer 26 may comprise any suitable mainframe, laptop, or personal computer known in the art. The computer 26 may be programmed in any suitable language to carry out the steps and functions mentioned hereinafter.

Figure 3:
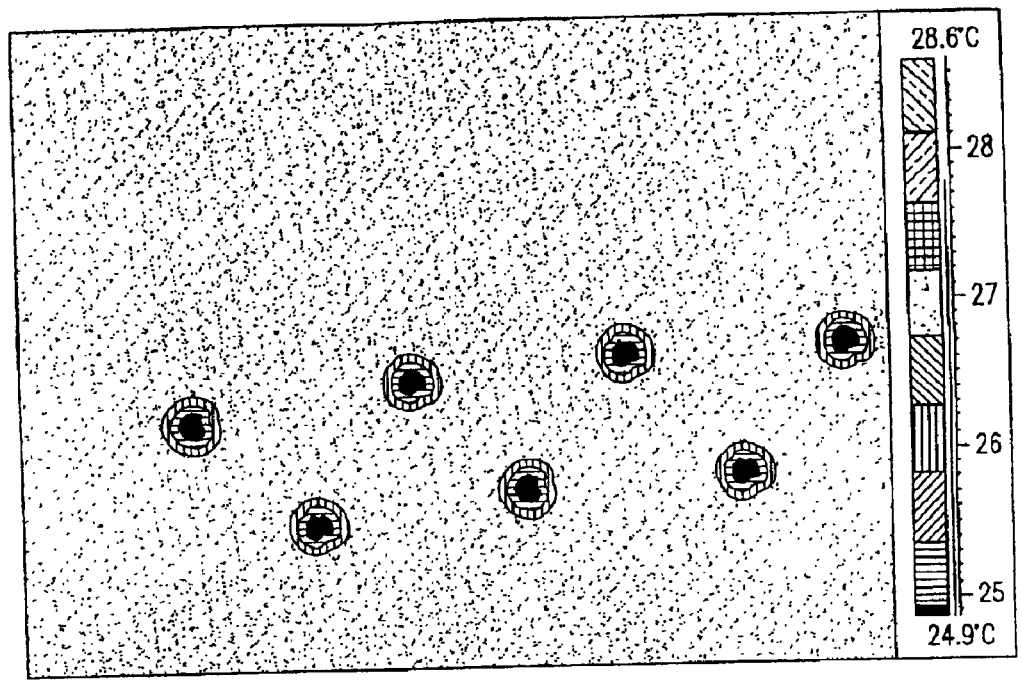
FIG. 3 is a thermal image generated by the system of FIG. 2.

In a first process in accordance with the present invention, the part 10 to be inspected is heated, preferably substantially uniformly, using heater 22. Thereafter, a thermal image of one or more cooling hole regions on the heated part 10 is taken using the camera 24. As mentioned above, the relative positions of the camera 24 and the cooling hole regions on the part 10 are arranged so that when an image is taken it completely fills in the pixels in the frame area to achieve maximum resolution. As a result of the substantially uniform heat application, the temperature at the different regions of the part 10 are imaged. Cooling hole regions will have low conductivity due to the holes 12 and those regions coated with the thermal barrier coating will exhibit a relative high conductivity. The high contrast thermal image which is taken by the camera 24 is outputted to the computer 26. In the thermal image, the center of each cooling hole will have the lowest temperature and the surface of the part or vane in the non-hole regions will have a uniformly high temperature. The hole-vane interface region will have a temperature which gradually rises from that of the hole to that of the surface. FIG. 3 illustrates a thermograph of a vane taken using an infra-red camera in accordance with the present invention.

The thermal image of the part 10 contains temperature information at each point on the pixel grid defined by the frame area. The two dimensional information provided by the pixel grid and the one dimensional temperature information are used by the computer 26 to calculate the position of each cooling hole 12.

Figure 4:
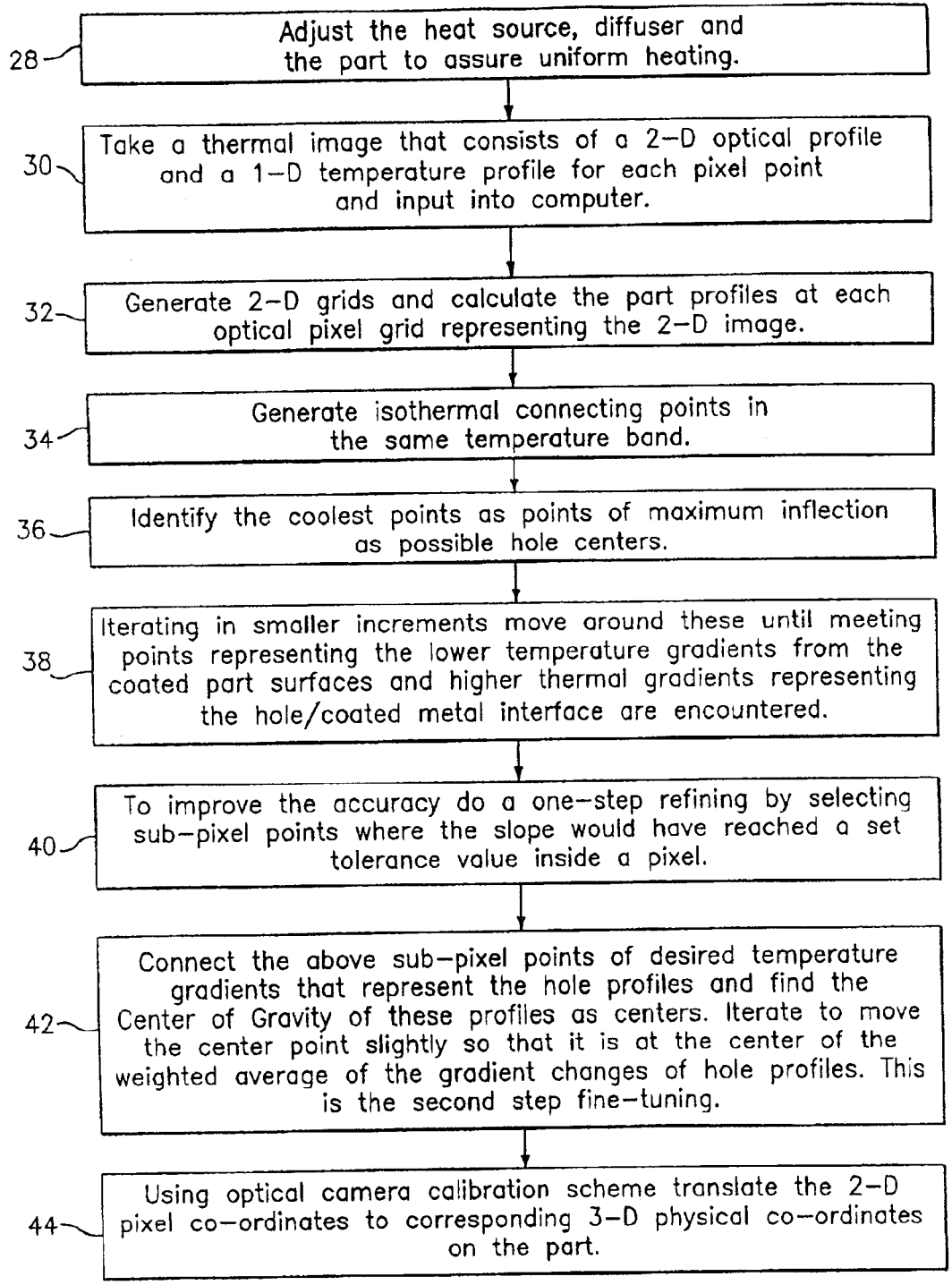
FIG. 4 is a flow chart showing how the thermal image is processed to determine the location of the cooling holes in the turbine vane.

FIG. 4 illustrates a flow chart showing the thermal imaging technique. In step 28, the part 10 is heated. The heat source, any heat diffuser, and the part are adjusted to assure uniform heating. In step 30, the above thermal image containing the above mentioned two dimensional optical profile and the one dimensional temperature profile for each pixel point is taken by the camera 24 and inputted into the computer 26 in digital form. From this information, as shown in step 32, two dimensional grids are generated and a profile of the part 10 at each optical pixel grid representing the two dimensional image is calculated. In step 34, the isothermal connecting points in the same temperature band are generated. Thereafter, in step 36, the coolest points are identified as points of maximum inflection and as possible hole centers. In step 38, iterations take place in small increments until meeting points representing the lower temperature gradients from the coated vane surface(s) and higher thermal gradients representing the hole/coated metal interface are encountered. The iterations occur in small increments in the region near the coolest points. In step 40, in order to improve the accuracy, a one step refining process is performed by selecting sub-pixel points, which are points inside a pixel element, where the conditions in step 38 are satisfied to improve the accuracy. In step 42, the above sub-pixel points of desired temperature gradients that represent the hole profiles are connected. Also, the center of gravity of these profiles as centers is found. Thereafter, a second fine tuning step is performed where the center point is moved slightly so that it is at the center of the weighted average of the gradient changes of the hole profiles. In step 44, the two dimensional pixel coordinates are translated to corresponding three dimensional physical coordinates on the vane. Optical camera calibration is used to give real world coordinates of a point whose position in the camera frame is known.

Figure 5:
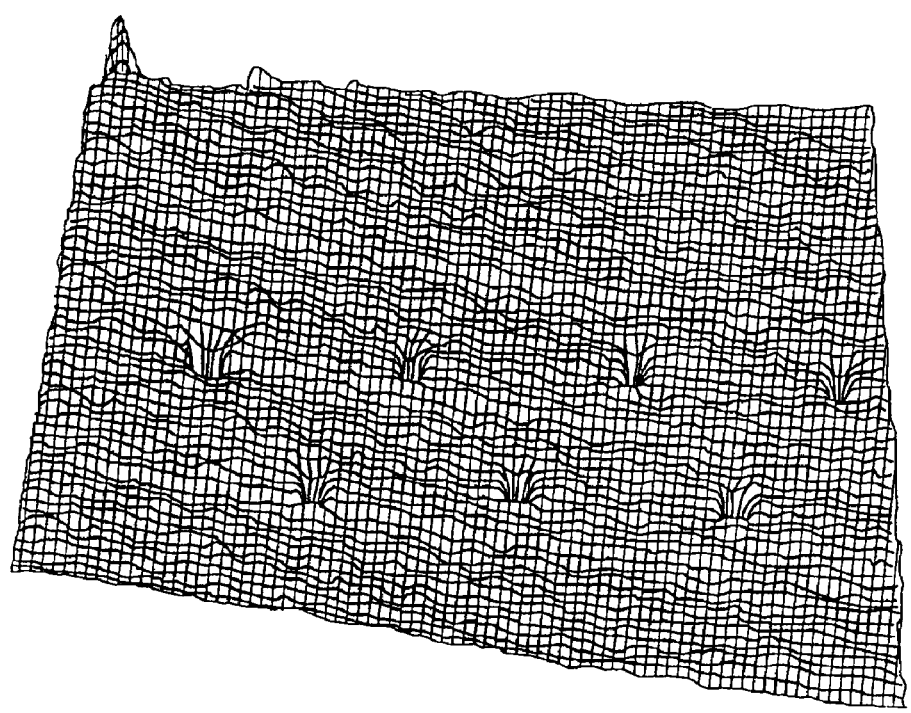
FIG. 5 is a three dimensional map showing the cooling holes as depressions.

FIG. 5 is an image showing the locations of the cooling holes identified on a test vane using the foregoing technique. The holes 12 are shown as depressions on a three dimensional map. The physical location of the hole centers are obtained from this three dimensional map. Using this particular method, it has been found that the demarcation of the holes 12 is very good. Further, the cooling hole location process is both fast and accurate.

Figure 6:
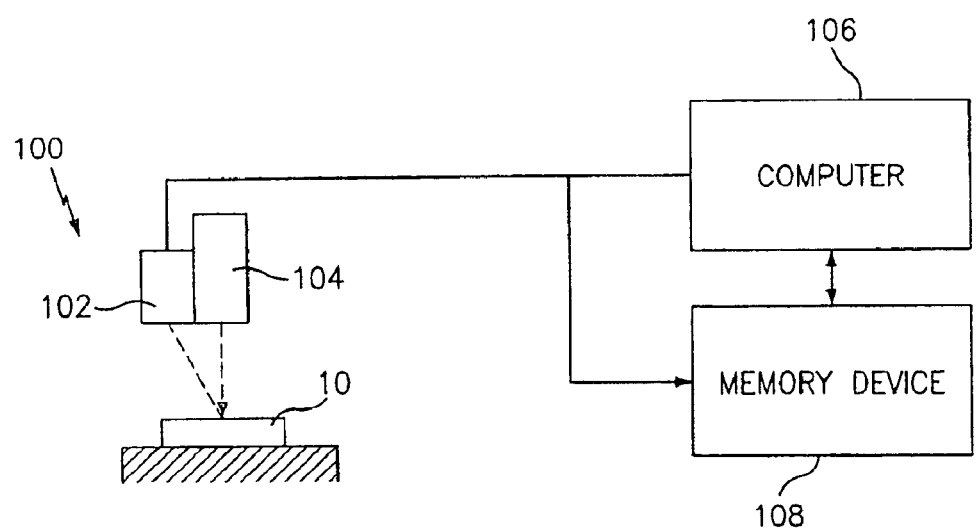
FIG. 6 is a schematic representation of a second embodiment of a system for locating the cooling holes in a vane.

A second approach for locating the cooling holes in a coated part, such as a coated vane is shown in FIG. 6. The system 100 shown therein utilizes a laser 104, a laser spot projector 102, and a spot sensor jointly represented as laser 104 to scan the cooling hole surface of the coated part. The system 100 utilizes information about the scanned surface to create a three dimensional profile of the coated part and the cooling hole surface. From this information, a profile of the part surface is constructed and is then digitally subtracted from the representation of the vane and cooling hole surface to obtain point clouds corresponding to the cooling hole locations. A laser beam from the laser 104 is reflected by the surface of the part 10 being scanned. The reflected light is observed by the sensor 102. From this, using triangulation, the depth of this point from the laser is calculated and transmitted to a computer 106.

The laser spot sensor 102 is programmed to scan in a horizontal plane (the X-Y plane) over the cooling hole region of the surface of the part 10. The sensor 102 outputs a calibrated Z depth of the vane surface as an analog voltage as it scans in the X-Y plane. The X and Y positions of the sensor 102 are obtained from the servos (not shown) driving the traversing axes and are recorded continuously at high speed using a high speed PC data bus.

Figure 7:
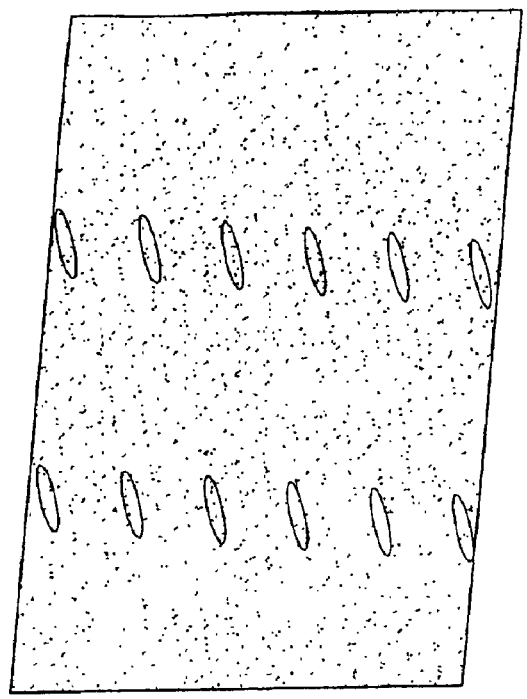
FIG. 7 is an image showing the raw scanned data obtained using the laser scanning technique.

The information outputted by the sensor 102 is stored in a suitable memory device 108 such as a hard drive, diskette, CD, etc. associated with a computer 106. The computer 106 may comprise any suitable computer known in the art and may be programmed using any suitable language known in the art. FIG. 7 illustrates an image of raw scanned data. The point cloud data represents points on the surface of the part 10. The scan density and scan lines over the holes 12 may be adjusted to produce a desired resolution in the recorded data.

Figure 8:
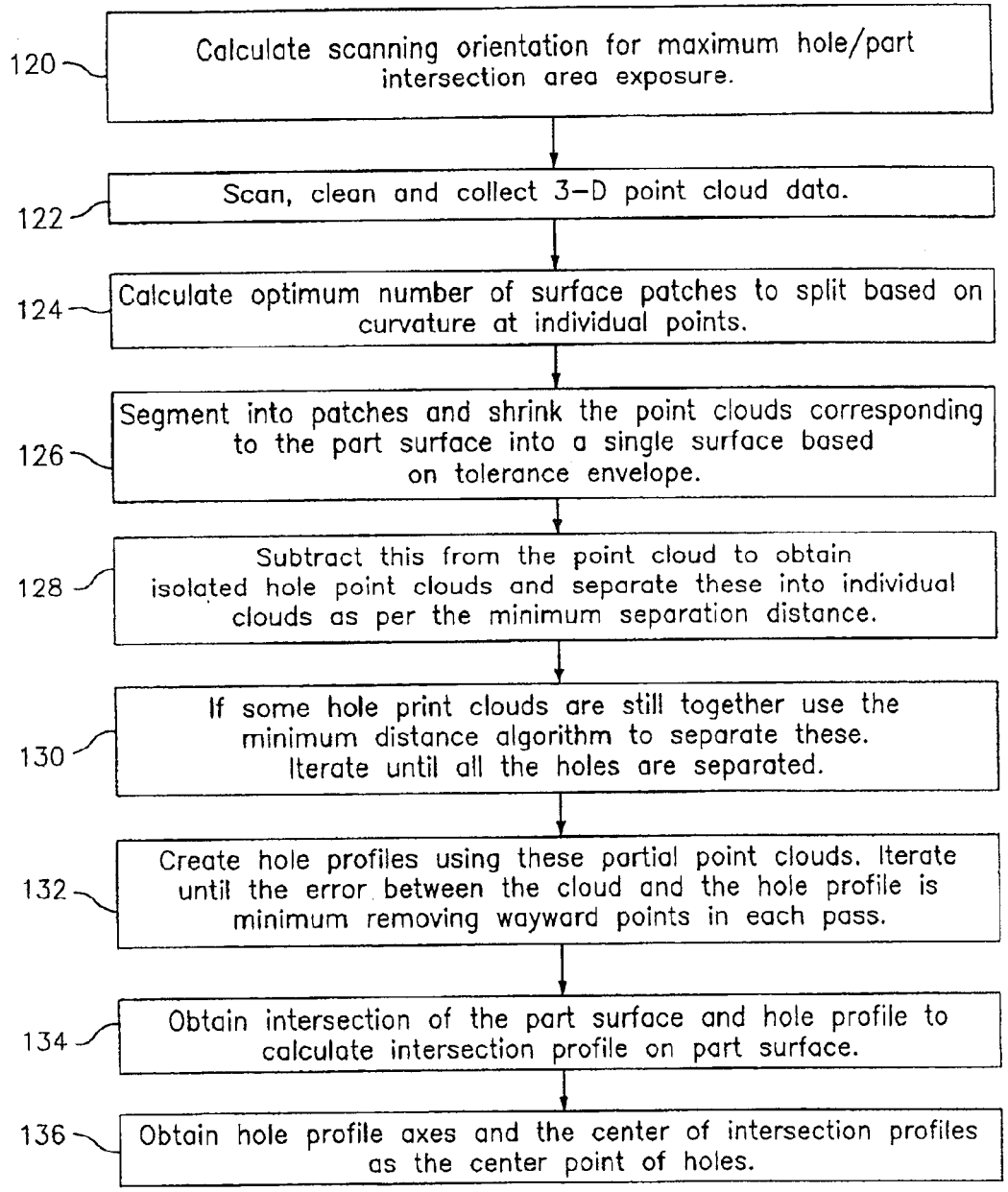
FIG. 8 is a flow chart illustrating how the point cloud data is processed to determine the location of the cooling holes in the part.

A software program in the computer 106 processes the point cloud data stored in the memory device 108. FIG. 8 is a flow chart of the process implemented by the laser scanning system. In step 120, a scanning orientation for maximum hole/vane intersection area exposure is calculated. The scanning orientation is the relative positioning of the cooling hole region with resect to the laser beam axis for scanning. Thereafter, the surface of the part 10 containing the coated cooling holes 12 are scanned. The information is cleaned so as to remove outlier points and other extraneous points coming into the system due to system noise and collected, as previously mentioned, as three dimensional point cloud data, in step 122. The surface of the part 10 is segmented into smaller surfaces called patches. In step 124, the optimum number of surface patches to be split based on curvature at individual points is calculated. In step 126, the data is segmented into patches and the point clouds corresponding to the part surface are shrunk into a single surface based on tolerance envelope. In other words, the large point clouds are separated into smaller point clouds and these smaller clouds are fitted into a single surface patch to represent the point clouds. When this fitting is done the patches envelope only those points within a certain tolerance envelope determined by the scanning accuracy. The information generated in step 126 is then subtracted from the point cloud to obtain isolated hole point clouds in step 128. Further, the isolated hole point clouds are separated into individual clouds having a minimum separation distance from its neighbor with the separation distance being smaller than the average distance between two adjacent hole boundaries. In step 130, hole point clouds which are still together are separated using a minimum distance algorithm. The minimum distance algorithm can be any suitable algorithm known in the art. Step 130 is iterated until all holes are separated.

In step 132, hole profiles are created using the above partial point clouds. This step is repeated a number of times to remove wayward points. This step is repeated until the error between the cloud and the hole profile is minimal.

In step 134, one extracts information about the intersection of the vane surface and the hole profile. From this information, an intersection profile on the surface of the part is calculated.

In step 136, the hole profile axes are obtained. Further, the center of intersection profiles as the center point of the holes is calculated.

Figure 9:
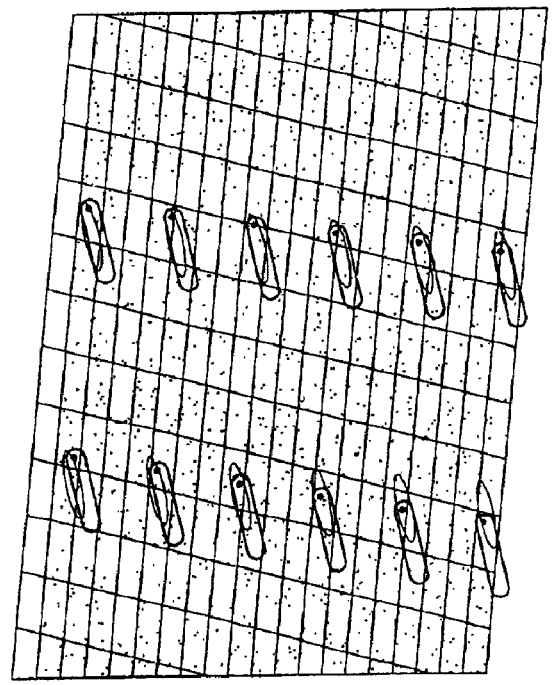
FIG. 9 is a diagram generated using the laser scanning process of the present invention showing the locations of the cooling holes.

From this process, a form representing the cooling hole is created. The size of the holes and the axial orientation of the holes are calculated from this hole form. FIG. 9 shows an output of the process containing cylinders representing the holes and lines representing the axes.

The laser scanning and thermal imaging techniques described herein can be used to reverse engineer parts whose cooling hole locations and patterns are unknown and thereby obtain the position and orientation of unknown cooling holes. A section of a first stage vane was scanned using the laser scanning method. The hole positions were calculated using the techniques described above. Then these positions were used to drive a precise probe pin on a Co-ordinate Measuring Machine (CMM) that can precisely measure a part to see if the probes would indeed go to these exact hole locations. In this test, the probe pin did precisely go to all the holes in the section.

The orientation of the holes could not be checked by the CMM directly and hence an indirect test was used. In this test, the angles between the hole axes in a given row were calculated taking one hole as a reference. This was then verified against the nominal orientation of the holes. Similarly, the calculated hole diameters were verified against the nominal hole diameters as well.

The calculated hole diameters were found to be 0.024 inches for each of the random holes sampled which was the same as the nominal hole diameter. The orientation of the holes in this section was within +/−1.0 degree of the nominal and the position of the holes was within +/−0.002 inches. These are exactly within the tolerance and the process capabilities of the laser drilling process used to place these holes.

While the processes and systems of the present invention have particular utility in the location of cooling holes in turbine vanes, the processes and systems could be used to located holes in other types of engine overhaul parts, where cooling holes for one reason or another are not completely visible.

It is apparent that there has been provided in accordance with the present invention a process and apparatus for locating coated cooling holes on turbine vanes which satisfies the means, objects, and advantages set forth hereinbefore. While the present invention has been described in the context of specific embodiments thereof, other alternatives, modifications, and variations will become apparent to those skilled in the art after reading the foregoing description. Therefore, it is intended to embrace those alternatives, modifications, and variations which fall within the broad scope of the appended claims.

What is claimed is:

1. A process for locating cooling holes on a part comprising the steps of:

provinding a part having a region of cooling holes covered by a coating;

using a heater to heat said part substantially uniformly so as to exploit thermal conductivity properties of different portions of said part; and identifying the locations of said coated cooling holes by generating a high contrast thermal image of said part and said region of coated cooling holes.

2. A process according to claim 1, wherein said part providing step comprises providing a turbine vane having a plurality of cooling holes coated by a thermal barrier, coating.

3. A process according to claim 1, wherein said identifying step comprises providing a thermal imaging camera having a pixel frame and spacing said cooling hole region of said part from said camera so that when a thermal image is taken, said image substantially fills the pixel frame of said camera.

4. A process according to claim 1, wherein said identifying step comprises generating two dimensional geometry information about the location of each cooling hole in said region and one dimensional temperature information for each cooling hole in said region.

5. A process according to claim 4, wherein said identifying step further comprises calculating the position of each said cooling hole in said region using said two dimensional geometry information and said one dimensional temperature information.

6. A process according to claim 1, wherein said heater using step comprises using a radiant heater to heat said part.

7. A process according to claim 1, wherein said heater using step comprises using a device for blowing hot air onto said part.

8. A process for locating coated cooling holes on a part comprising the steps of:

providing a part having a region of coated cooling holes;

heating said part;

identifying the locations of said coated cooling holes by generating a high contrast thermal image of said part and said region of coated cooling holes;

said identifying step comprises generating two dimensional geometry information about the location of each cooling hole in said region and one dimensional temperature information for each cooling hole in said region;

said identifying step further comprising calculating the position of each said cooling hole in said region using said two dimensional geometry information and said one dimensional temperature information; and said calculating step comprising drawing isothermal lines and connecting points at the same temperature; determining slopes between adjacent ones of said isothermal lines; and determining a Z-depth at a given location from the temperature at said location.

9. A process according to claim 8, wherein said calculating step further comprises:

determining the X-Y location of the surface of the part from its corresponding pixel location on the camera picture frame; and creating a three dimensional model by matching said Z dimension with a corresponding X-Y location.

10. A system for locating coated cooling holes in parts which comprises:

a heater for substantially uniformly heating a part having a surface with a plurality of cooling holes;

an infra red camera for scanning said surface of said part and for generating a thermal image of said scanned surface; and a computer for determining the locations of said cooling holes from said thermal image.

11. A system according to claim 10, wherein said heater comprises a radiant heater.

12. A system according to claim 10, wherein said heater comprises a device for blowing hot air onto said part.

13. A system according to claim 10, wherein said infra red camera has a frame area defined by a finite number of pixels and wherein said camera is spaced from said part by a distance such that when a thermal image of a scanned surface is taken, the image completely fills the pixels in said frame area.

* * * * *